(12) United States Patent
Cheng

(10) Patent No.: US 9,229,629 B2
(45) Date of Patent: Jan. 5, 2016

(54) DEVICE IDENTIFICATION METHOD, COMMUNICATIVE CONNECTION METHOD BETWEEN MULTIPLE DEVICES, AND INTERFACE CONTROLLING METHOD

(71) Applicant: Transcend Information, Inc., Taipei (TW)

(72) Inventor: Shian-Luen Cheng, Kaohsiung (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 383 days.

(21) Appl. No.: 13/846,778

(22) Filed: Mar. 18, 2013

(65) Prior Publication Data

US 2014/0282067 A1    Sep. 18, 2014

(51) Int. Cl.
| | |
|---|---|
| *G06F 3/00* | (2006.01) |
| *G06F 3/0486* | (2013.01) |
| *G06F 3/0481* | (2013.01) |
| *H04W 76/02* | (2009.01) |
| *G06F 3/0488* | (2013.01) |

(52) U.S. Cl.
CPC .......... *G06F 3/0486* (2013.01); *G06F 3/04817* (2013.01); *G06F 3/04883* (2013.01); *H04W 76/023* (2013.01); *G06F 2203/04803* (2013.01); *G06F 2203/04808* (2013.01)

(58) Field of Classification Search
CPC .................. H04W 76/023; G06F 2203/04803; G06F 2203/04808; G06F 3/0486; G06F 3/04817; G06F 3/04883; G06F 3/00; G06K 9/00

See application file for complete search history.

(56) References Cited

U.S. PATENT DOCUMENTS

| | | | |
|---|---|---|---|
| 7,479,949 B2 | 1/2009 | Jobs et al. | |
| 7,936,341 B2 | 5/2011 | Weiss | |
| 8,057,233 B2 * | 11/2011 | Owen ....................... | G09B 1/34 172/176 |
| 8,587,549 B2 * | 11/2013 | Whytock et al. .............. | 345/173 |
| 2002/0091877 A1 * | 7/2002 | Karidis ............................ | 710/1 |
| 2004/0019724 A1 * | 1/2004 | Singleton et al. ............. | 710/303 |
| 2007/0062852 A1 * | 3/2007 | Zachut et al. .................. | 209/683 |
| 2009/0143141 A1 * | 6/2009 | Wells et al. ...................... | 463/37 |
| 2009/0215397 A1 * | 8/2009 | Thorn et al. .................. | 455/41.2 |
| 2011/0177785 A1 * | 7/2011 | Rekimoto et al. ............ | 455/41.3 |
| 2011/0227871 A1 * | 9/2011 | Cannon .......................... | 345/174 |
| 2012/0054057 A1 * | 3/2012 | O'Connell .............. | G06F 21/36 705/26.1 |
| 2012/0206391 A1 * | 8/2012 | Kim et al. ...................... | 345/173 |
| 2013/0093713 A1 * | 4/2013 | Bose et al. ..................... | 345/174 |

\* cited by examiner

*Primary Examiner* — Dino Kujundzic
(74) *Attorney, Agent, or Firm* — Winston Hsu; Scott Margo

(57) ABSTRACT

A device identification method, a communicative connection method between multiple devices, and an interface controlling method are disclosed herein. The devices include a first device and at least one second device. The first device includes a touch-sensing interface and a first wireless communication module. Each second device comprising a second wireless communication module and physical contacts arranged with a distinct pattern. The communicative connection method includes steps of: sensing a multi-touch input by the touch-sensing interface when one of the second devices is currently placed upon the touch-sensing interface of the first device; identifying the second device currently placed upon the first device by matching the multi-touch input with the distinct pattern; and, forming a wireless communicative connection between the first wireless communication module of the first device and the second wireless communication module of the matched second device.

16 Claims, 9 Drawing Sheets

DEVICE IDENTIFICATION METHOD, COMMUNICATIVE CONNECTION METHOD BETWEEN MULTIPLE DEVICES, AND INTERFACE CONTROLLING METHOD

BACKGROUND

1. Field of Invention

The present application relates to controlling method between multiple devices. More particularly, the present application relates to controlling method for establishing a communicative connection between devices.

2. Description of Related Art

Recently, portable communication devices become common belongings to everyone in modern society. For example, mobile phones, personal digital assistants, smart phones and tablet computers are widespread in various applications. Portable communication devices are popular because the devices have high portability and various functions (such as internet surfing, multimedia message transmitting, file sharing, document editing, photo shooting and paper reading).

In order to maintain high portability, most of the portable devices are regulated by limited sizes and limited weights. Therefore, wireless storage devices (e.g., a stand-alone hard drive accessible through Wi-Fi connection) are developed as a storage extension for the portable devices. In some practices, the portable device can not share files with the wireless storage device directly. The portable device and the wireless storage device are usually connected through another wireless access point.

In some other practices, the portable device may be connected to the wireless storage device via a Peer-to-Peer (P2P) protocol such as Wireless Fidelity (WiFi) direct. However, users must manually set up the wireless connection (selecting the target device to connect, typing in the password, configuring other parameter of the connection) between the portable device and the wireless storage device. It is not user-friendly to common users and also confusing when there are many other devices around the portable device.

SUMMARY

An aspect of the present application is to provide a device identification method, which includes steps of: providing a first device comprising a touch-sensing interface; providing at least one second device, and each second device comprising a plurality of physical contacts arranged with a distinct pattern; sensing a multi-touch input by the touch-sensing interface when one of the second devices is currently placed upon the touch-sensing interface of the first device; and, identifying the second device currently placed upon the first device by matching the multi-touch input with the distinct pattern.

Another aspect of the present application is to provide a communicative connection method between multiple devices. The devices include a first device and at least one second device. The first device includes a touch-sensing interface and a first wireless communication module. Each second device comprising a second wireless communication module and physical contacts arranged with a distinct pattern. The communicative connection method includes steps of: sensing a multi-touch input by the touch-sensing interface when one of the second devices is currently placed upon the touch-sensing interface of the first device; identifying the second device currently placed upon the first device by matching the multi-touch input with the distinct pattern; and, forming a wireless communicative connection between the first wireless communication module of the first device and the second wireless communication module of the matched second device.

Another aspect of the present application is to provide an interface controlling method of a wireless communicative connection between multiple devices. The devices include a first device and at least one second device. The first device includes a displaying interface, a first wireless communication module and a touch-sensing interface integrated on the displaying interface. Each second device includes a second wireless communication module and a plurality of physical contacts arranged with a distinct pattern. The communicative connection method include steps of: sensing a multi-touch input by the touch-sensing interface when one of the second devices is currently placed upon the touch-sensing interface of the first device; identifying the second device currently placed upon the first device by matching the multi-touch input with the distinct pattern; forming a wireless communicative connection between the first wireless communication module of the first device and the second wireless communication module of the matched second device; and, splitting a screen on the displaying interface into a first partition and a second partition.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
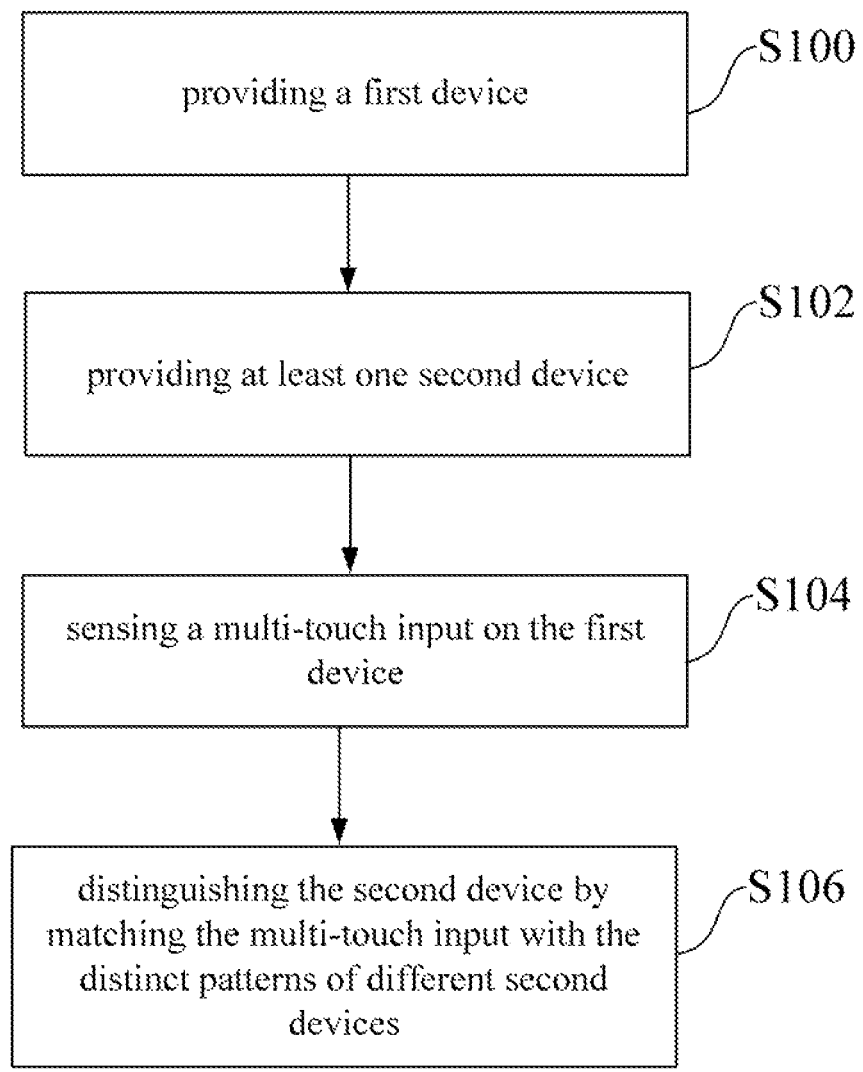
FIG. 1 is a flow chart illustrating a device identification method according an embodiment of the disclosure.

Reference is made to FIG. 1. FIG. 1 is a flow chart illustrating a device identification method according to an embodiment of the disclosure.

The device identification method is configured to be used between multiple devices, including a first device and one or more second devices. By utilizing this device identification method, the first device may identify which one of the second devices is near the first device and is ready to be communicatively connected with the first device.

Figure 2:
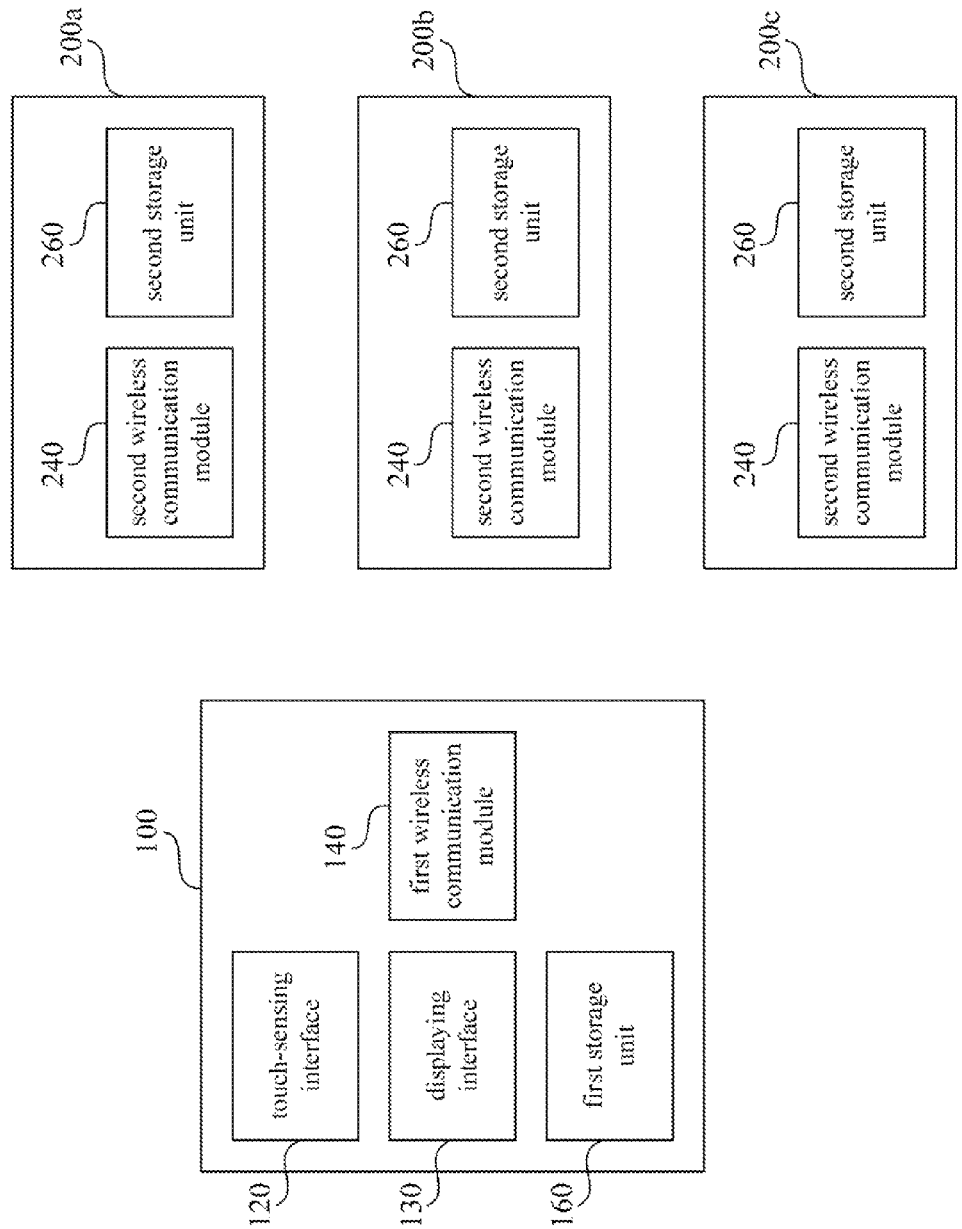
FIG. 2 is a functional block diagram illustrating a first device and second devices according to an embodiment of the disclosure.
Figure 3:
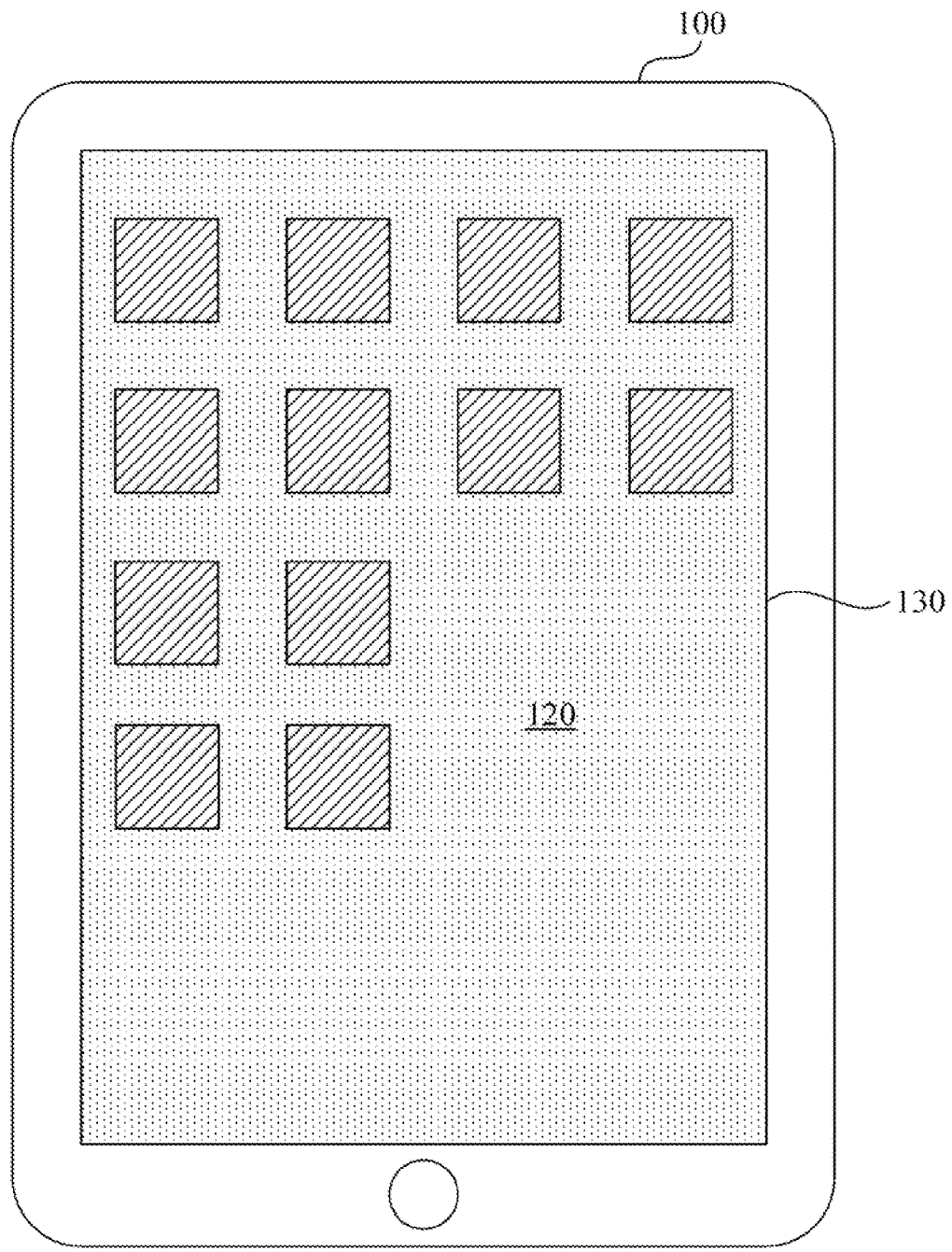
FIG. 3 is an external view illustrating the first device according to an embodiment of the disclosure.

As shown in FIG. 1, step S100 is performed for providing a first device. Reference is also made to FIG. 2 and FIG. 3. FIG. 2 is a functional block diagram illustrating the first device 100 and second devices 200a, 200b and 200c according to an embodiment of the disclosure. FIG. 3 is an external view illustrating the first device 100 according to an embodiment of the disclosure.

In this embodiment, the first device 100 includes a touch-sensing interface 120. In addition, the first device 100 may includes a displaying interface 130, a first wireless communication module 140 and a first storage unit 160. The touch-sensing interface 120 can be integrated on the displaying interface 130 (as shown in FIG. 3). In practices, the first device 100 can be a tablet computer, a Mobile Internet Device (MID), a laptop computer with a touch-sensing function or any equivalent portable device with the touch-sensing interface 120.

The first wireless communication module 140 can be a communication transceiver based on a protocol selected from Wireless Fidelity (WiFi), WiFi direct, Zigbee, Near Field Communication (NFC) and Infrared Communication.

Figure 4C:
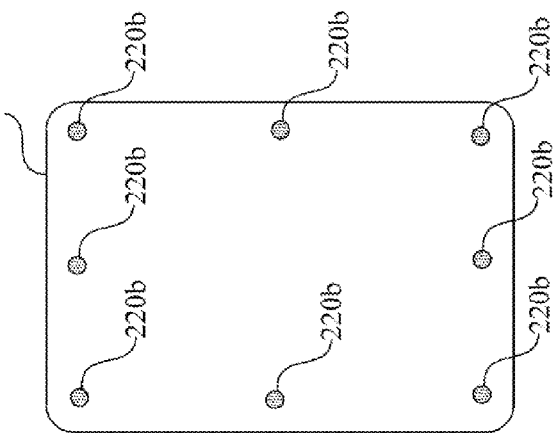
FIG. 4A, FIG. 4B and FIG. 4C are external views illustrating different second devices according to some embodiments of the disclosure.
Figure 4B:
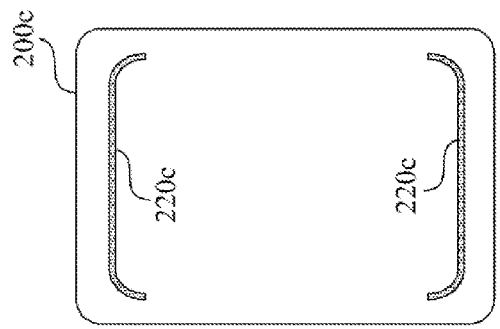
Figure 4A:
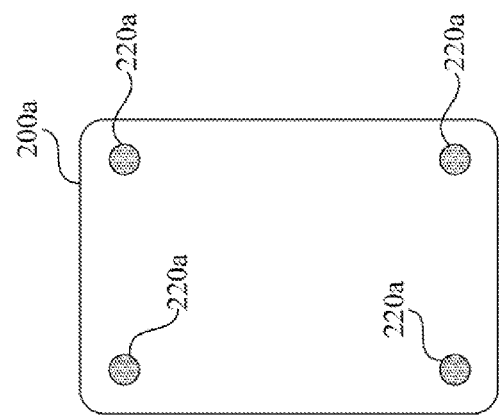

As shown in FIG. 1, step S102 is performed to provide a second device. Reference is also made to FIG. 4A, FIG. 4B and FIG. 4C. FIG. 4A, FIG. 4B and FIG. 4C are external views illustrating different second devices 200a, 200b and 200c according to some embodiments of the disclosure.

As shown in FIGS. 4A, 5B and 5C, each one of the second devices (200a, 200b and 200c) includes a plurality of physical contacts arranged with a distinct pattern. In practices, the second devices 200a, 200b and 200c can be stand-alone hard drives, external hard disks, or any data storage device with wireless accessibility.

For example, the second device 200a shown in the embodiment shown in FIG. 4A has four round-shaped physical contacts 220a (which can be anti-slip pads for holding the second device 200a on an external surface) disposed on one surface of outer casing of the second device 200a. Four round-shaped physical contacts 220a are arranged at specific positions on a surface of the second device 200a.

On the other hand, the second device 200b shown in the embodiment shown in FIG. 4B has eight round-shaped physical contacts 220b (which can be anti-slip dots for holding the second device 200b on an external surface). Eight round-shaped physical contacts 220b are arranged at specific positions on a surface of the second device 200b.

In addition, the second device 200c shown in the embodiment shown in FIG. 4C has two line-shaped physical contacts 220c (which can be anti-slip lines for holding the second device 200c on an external surface). Two round-shaped physical contacts 220b are arranged at specific positions on a surface of the second device 200c.

As we can see from FIG. 4A to FIG. 4C, each of different second devices (such as 200a, 200b and 200c) has its own physical contacts arranged with a pattern different from each others. The pattern of each second device 200a, 200b or 200c can be differentiated by sizes, total amounts and/or shapes of physical contacts 220a, 220b and 220c, and also be differentiated by spacing distances and distributions between physical contacts 220a, 220b and 220c. In other words, each of the second devices has the physical contacts with a distant pattern in this embodiment.

As shown in FIG. 2, each of the second devices (i.e., the second device 200a, 200b or 200c) further includes a second wireless communication module 240 and a second storage unit 260.

The second wireless communication module 240 can be a communication transceiver based on a protocol selected from Wireless Fidelity (WiFi), WiFi direct, Zigbee, Near Field Communication (NFC) and Infrared Communication.

In the following paragraphs, the second device 200a is taken as an example to interact with the first device 100 for demonstration, and the disclosure is not limited therein.

When the second device 200a is currently placed upon the touch-sensing interface of the first device, step S104 is performed for sensing a multi-touch input by the touch-sensing interface 120 on the first device 100. In this case, the multi-touch input will match the physical contacts 220a arranged with the distinct pattern of the second device 200a.

Afterward, step S106 is performed for identifying the second device (i.e., the second device 200a in this case) currently placed upon the first device 100 by matching the multi-touch input with the distinct patterns of different second devices. In this case, the multi-touch input will match the distinct pattern corresponding to the physical contacts 220a of the second device 200a, such that the first device 100 may acknowledge that the second device 200a is currently placed upon the first device 100.

It is noted that, the first device 100 may identify one second device from the second devices (e.g., the second device 200a in this case) by a relative distribution between the physical contacts (or relative coordinates of the physical contacts) of the matched second device. Therefore, the second device (200a, 200b or 200c) is not limited to be placed along a specific direction upon the first device 100.

In the same way, when another second device 200b or 200c is placed upon the first device 100, it can be identified by matching the multi-touch input with the distinct patterns of different second devices 200b or 200c.

In an embodiment of this disclosure, user may easily establish a wireless commutative connection between the first wireless communication module 140 of the first device 100 and the second wireless communication module 240 of one of the second device (200a, 200b or 200c) by placing the second device (200a, 200b or 200c) upon the touch-sensing interface 120 of the first device 100.

Figure 5:
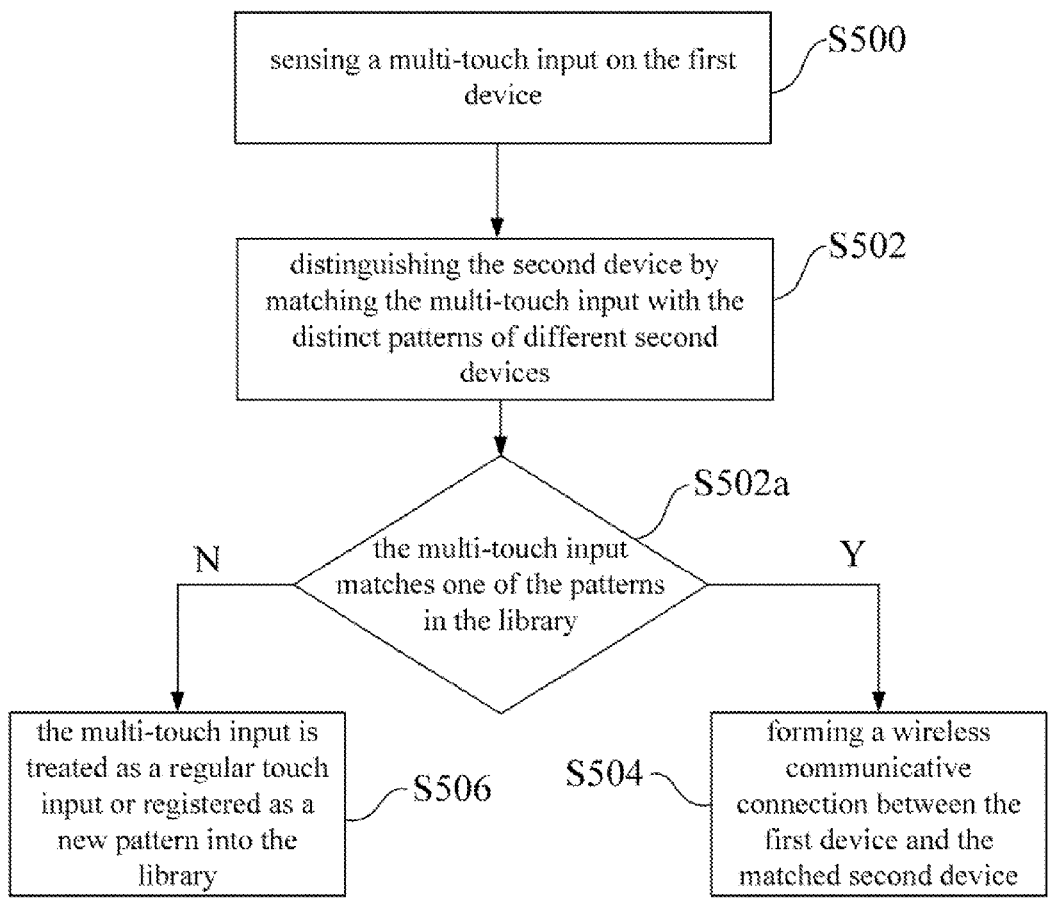
FIG. 5 is a flow chart illustrating a communicative connection method between multiple devices according to an embodiment of the disclosure.

Reference is made to FIG. 5. FIG. 5 is a flow chart illustrating a communicative connection method between multiple devices according to an embodiment of the disclosure. The communicative connection method is based on the device identification method in aforesaid embodiment.

The communicative connection method can be used between the first device 100 (referring to FIG. 2 and FIG. 3 and aforesaid embodiments) and the second device 200a, 200b and 200c (referring to FIG. 2 and FIGS. 4A-4C and aforesaid embodiments).

As shown in FIG. 5, step S500 is performed for sensing a multi-touch input by the touch-sensing interface when one of the second devices is currently placed upon the touch-sensing interface of the first device (also referring to step S104).

Afterward, step S502 is performed for identifying the second device currently placed upon the first device by matching the multi-touch input with the distinct pattern.

In this embodiment, the first device 100 further includes a library configured for storing a plurality of patterns corresponding to different second devices (e.g., the distinct patterns of the physical contacts on the second devices 200a, 200b and 200c) and a plurality of wireless communication configurations corresponding to the second wireless communication modules 240 of different second devices (e.g., the second devices 200a, 200b and 200c).

For example, the wireless communication configurations include contents of Service Set Identifications (SSID), Media Access Control (MAC) addresses, passwords, encryption keys and Internet Protocol (IP) addresses of different second devices 200a, 200b or 200c. These wireless communication configurations are information needed by the first wireless communication module 140 to establish a wireless communicative connection with the second wireless communication modules 240 on different second devices 200a, 200b and 200c. The library may maintain a lookup table, which records the relationship between the wireless communication configurations and the patterns of multi-touch input on each second device.

In this embodiment, during step S502 of identifying the second device, step S502a is further performed for comparing the multi-touch input to the patterns stored in the library.

If the multi-touch input is matched with one of the patterns in the library in step S502a, one corresponding wireless communication configuration is loaded by first wireless communication module 140, and step S504 is performed for forming a wireless communicative connection between the first wireless communication module 140 of the first device 100 and the second wireless communication module 240 of the matched second device (200a, 200b or 200c). Some detail mechanism processes may be included in Step S504 for forming the wireless communicative connection, e.g., enabling the first wireless communication module 140, searching for a wireless connection signal provided from the second wireless communication module 240, and completing the wireless communicative connection between the first wireless communication module 140 of the first device 100 and the second wireless communication module 240 etc.

On the other hand, if the multi-touch input is not matched to any pattern in the library in step S502a, step S506 can be performed for treating the multi-touch input as a regular touch input (for example, the regular touch input can be an input signal of normal touch operation, which includes dragging, selecting, clicking, zooming in/out, or any equivalent touch operations in conventional practices), or registering the multi-touch input as a new pattern into the library. The default action in Step S506 can be manually adjusted by user.

In an embodiment of the disclosure, the library may further store privilege levels corresponding to different second devices. After the wireless communicative connection is formed (i.e., S504), the first device 100 may provides different privilege levels to different second devices. Therefore, each of the second devices may have different limitations of authority (read-and-write, read-only, two-way data transmission, one-way data transmission, etc) relative to the first device, such that the first device may provide different functions to different authentications of second devices. In this case, the lookup table of the library may record the relationship between the wireless communication configurations, the patterns of multi-touch input and the privilege levels on the second devices.

Based on aforesaid embodiment, the first device in this disclosure may identify one specific second device currently placed on the first device, and establish wireless communicative connection to the specific second device automatically. In this case, the first device and the second device may share/exchange/display files stored in the first/second storage unit of both devices.

Figure 6:
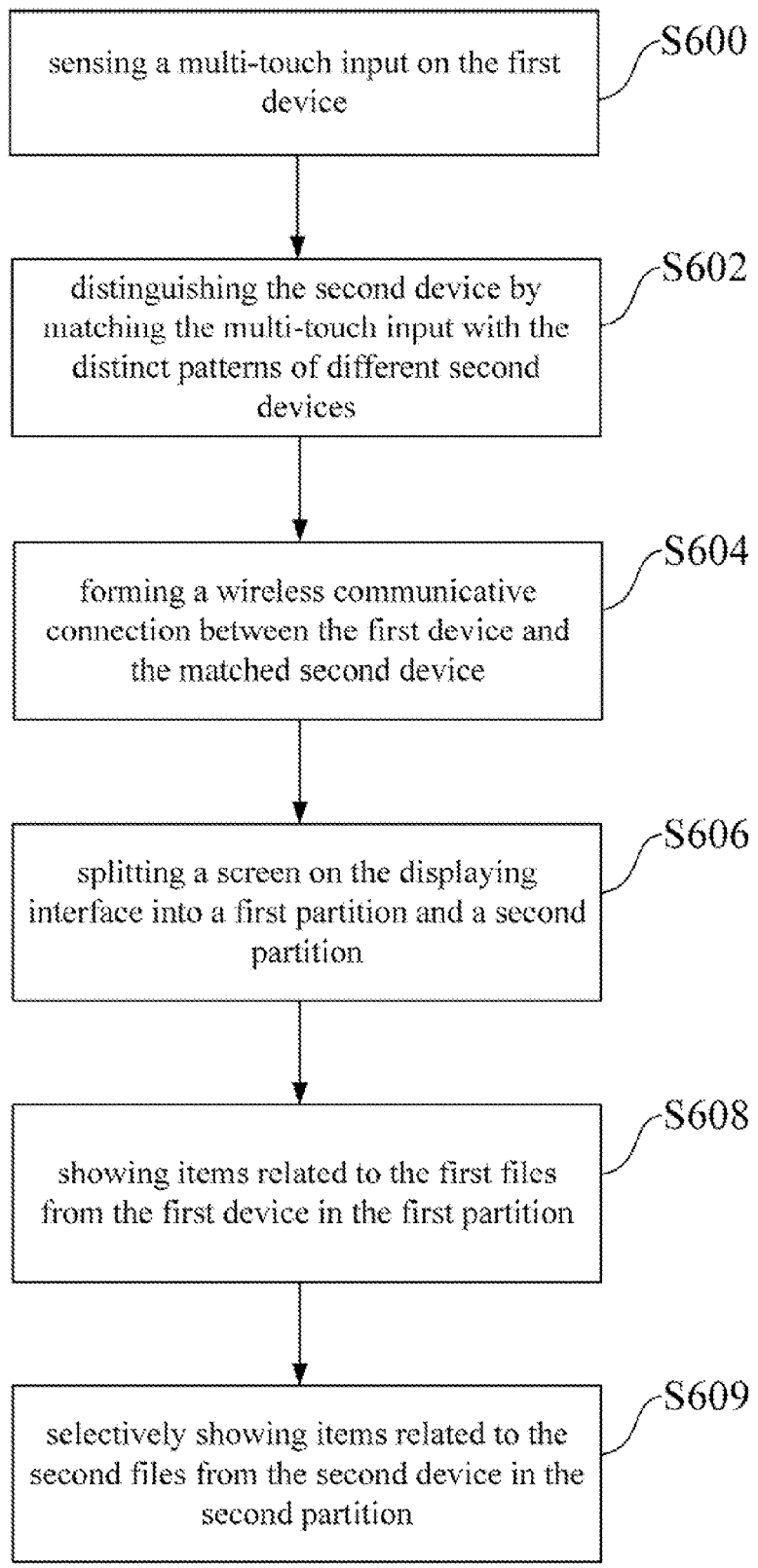
FIG. 6 is a flow chart illustrating an interface controlling method between multiple devices according to an embodiment of the disclosure.

Reference is made to FIG. 6, which is a flow chart illustrating an interface controlling method between multiple devices according to an embodiment of the disclosure. The communicative connection method is based on the device identification method and the communicative connection method in aforesaid embodiments.

As shown in FIG. 6, after steps S600 to S604 (can be referred to S500 to S504 in aforesaid embodiment), a wireless communicative connection between the first device 100 and the matched second device (e.g., the second device 200a in this example) is formed.

Figure 7A:
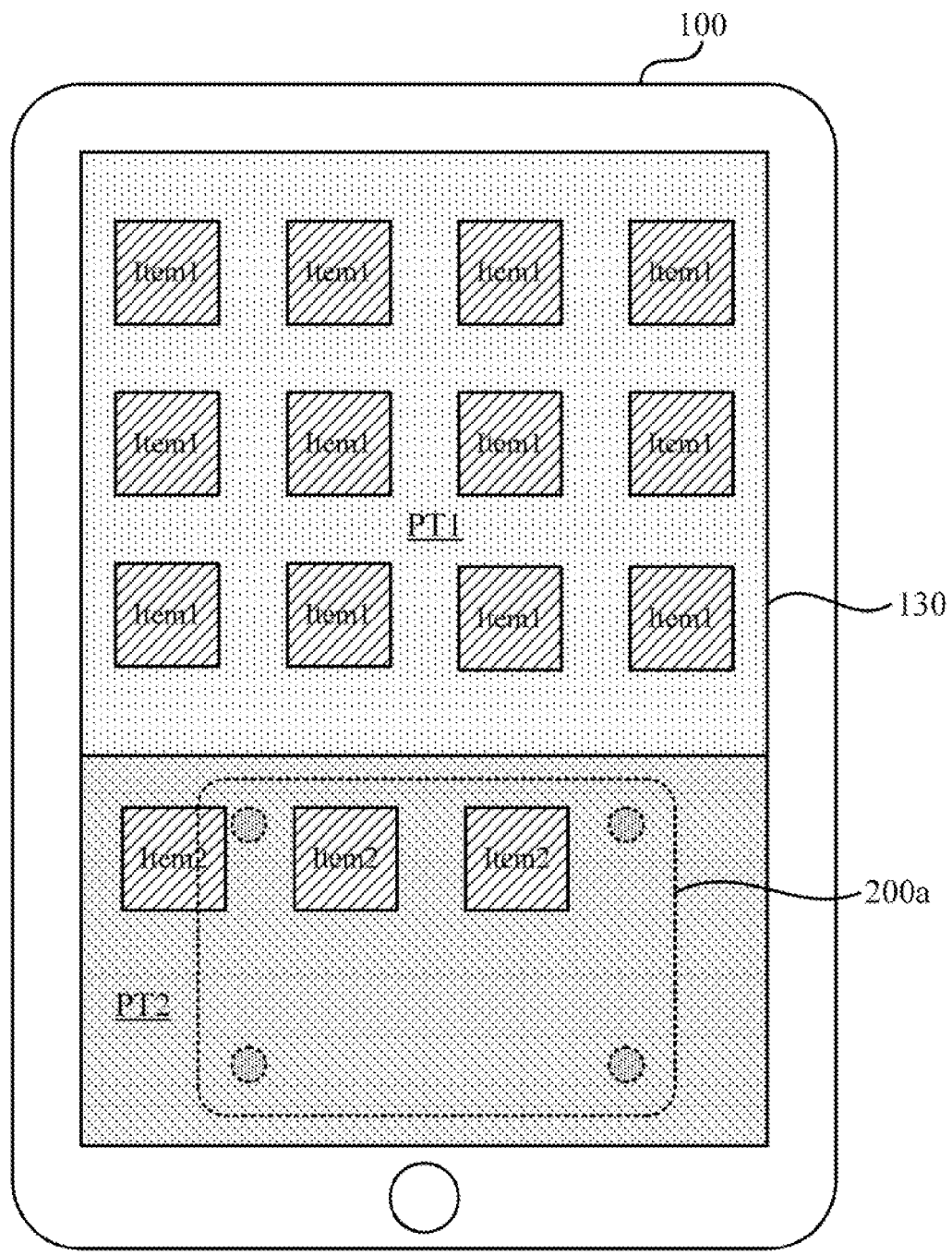
FIG. 7A and FIG. 7B are schematic diagrams illustrating the relationship between the first device and the second device according to two embodiments of the disclosure.
Figure 7B:
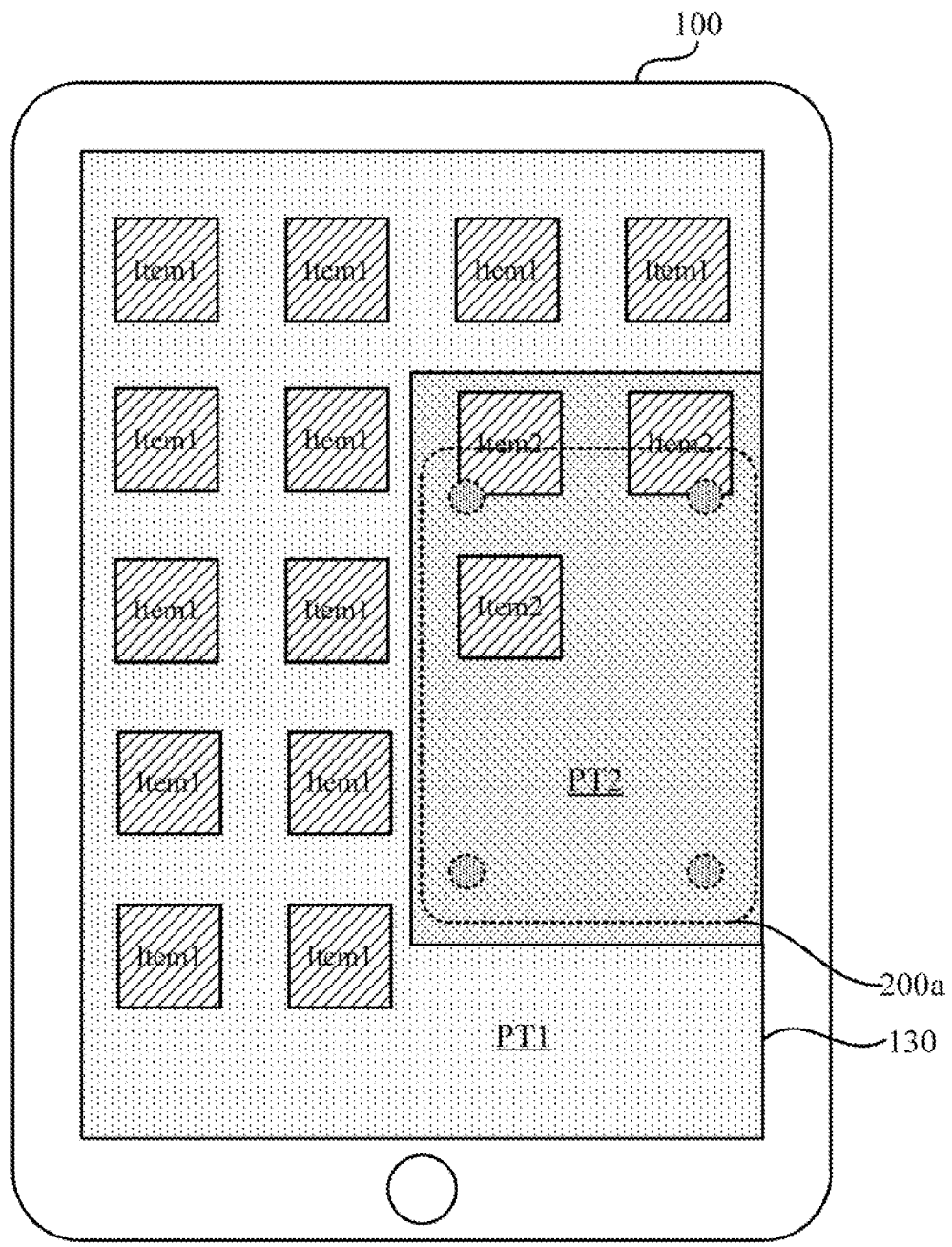

Reference is also made to FIG. 7A and FIG. 7B, which are schematic diagrams illustrating the relationship between the first device 100 and the second device 200a according to two embodiments of the disclosure.

Afterward, step S606 is performed for splitting a screen on the displaying interface 130 into a first partition PT1 and a second partition PT2. In this embodiment, the second partition PT2 may be located at where the second device 200a is placed on the first device 100. In another embodiment, the second partition PT2 may be located at a fixed area/location (e.g., fixed on the top area, or fixed at the bottom area, etc) on the displaying interface 130 when the wireless communicative connection between the first device 100 and the matched second device 200 is formed. As shown in FIG. 7A and FIG. 7B, the second partition PT2 is located at the different positions on the displaying interface 130 according to where second device 200a is placed. In FIG. 7A, the displaying interface 130 is split horizontally with the first partition PT1 on top and the second partition PT2 at the bottom. In FIG. 7B, the displaying interface 130 is split with the second partition PT2 on the right side. However, the disclosure is not limited thereto.

In this embodiment, the first storage unit 160 of the first device 100 may store first files (e.g., application programs, pictures, videos, contact lists, emails, etc) on the first device 100. The second storage unit 260 of the second device 200a may also stores second files (e.g., application programs, pictures, videos, contact lists, emails, etc) on the second device 200.

Step S608 is performed for showing items Item1 related to the first files from the first device 100 in the first partition PT1. Step S609 is performed for selectively showing items Item2 related to the second files from the second device 200a in the second partition PT2.

In an embodiment, the items Item1 and Item2 can be displayed in the first partition PT1 and the second partition PT2 automatically after the wireless communicative connection is established (S604) and the partitions are formed (S606). However, the disclosure is not limited thereto. In another embodiment, the items Item2 from the second device 200a can be selectively displayed on the second partition PT2 according to commands from user. For example, when the second partition PT2 is formed, the items Item2 will not be displayed initially in the second partition. In this case, the items Item2 will only be displayed after the user confirms to display the contents in the second device 200a.

As shown in FIG. 7A and FIG. 7B, the items Item1 and Item2 can be re-arranged at different positions according to the distribution of the first and the second partitions PT1 and PT2.

Figure 7C:
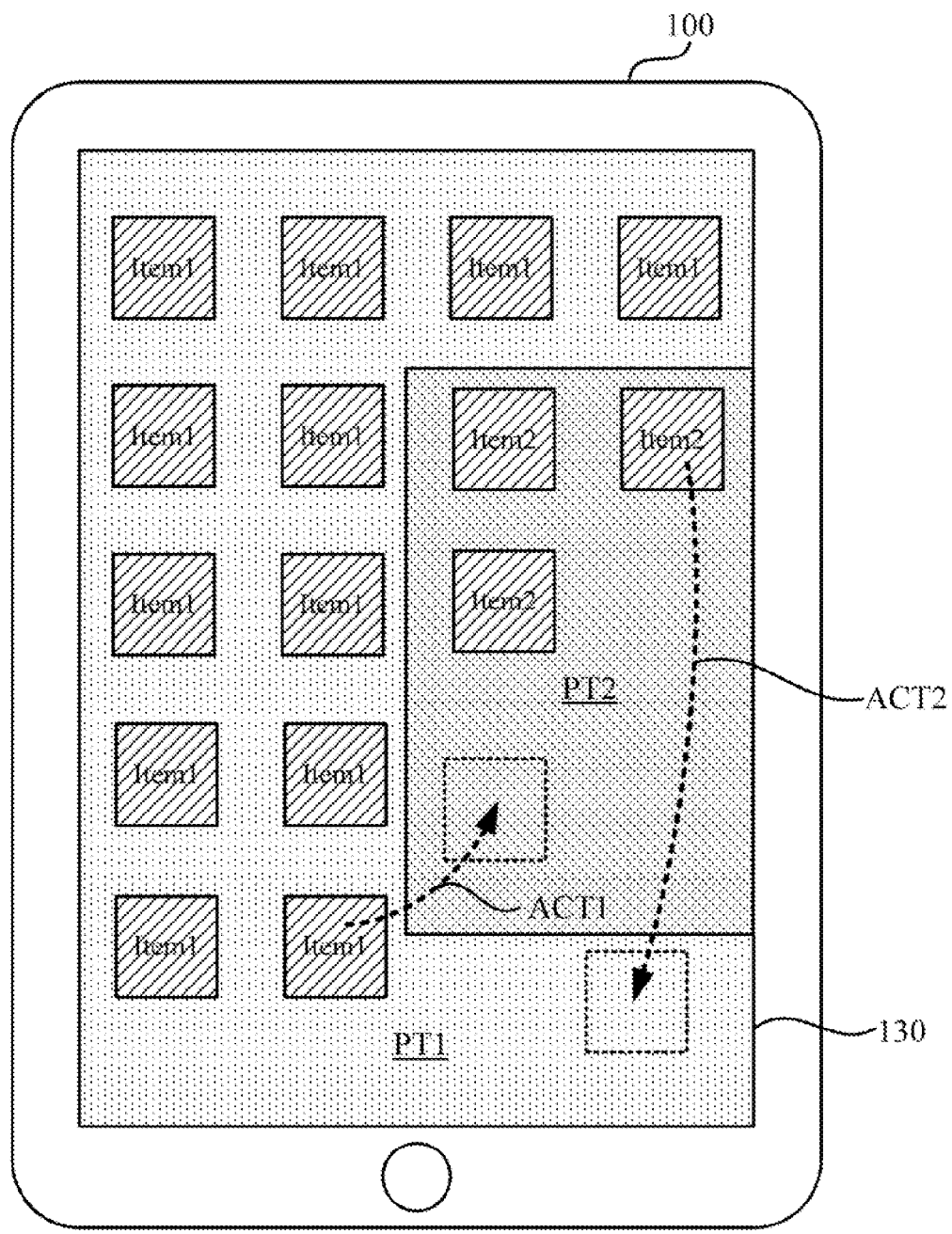
FIG. 7C is a schematic diagram illustrating exemplary manipulations between two partitions according to an embodiment of the disclosure.

Reference is also made to FIG. 7C, which is a schematic diagram illustrating exemplary manipulations between two partitions PT1 and PT2 according to an embodiment of the disclosure.

In practices, if one of the items Item1 from the first device 100 is selected and dragged from the first partition PT1 to the second partition PT2 (e.g., as the exemplary manipulation ACT1 shown in FIG. 7C), the file related to the selected item Item1 will be transmitted from the first device 100 to the second device 200a through the wireless communicative connection.

On the other hand, if one of the items Item2 from the second device 200a is selected and dragged from the second partition PT2 to the first partition PT1 (e.g., as the exemplary manipulation ACT2 shown in FIG. 7C), the file related to the selected item Item2 from the second device 200a will be transmitted to the first device 100 through the wireless communicative connection.

Based on aforesaid embodiments, this disclosure provides methods for identifying different devices based on specific multi-touch patterns, automatically establishing a wireless communicative connection to the identified device and exchanging files between devices based on the wireless communicative connection. Therefore, users may easily set up the wireless communication between devices without memorizing complex passwords, parameters or setting steps. The data transmission between multiple devices will be more user-friendly and intuitive to operate.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:

1. A method of a wireless communicative connection between multiple devices, comprising:
   providing a first device comprising a touch-sensing interface;
   providing at least one second device, each second device comprising a plurality of physical contacts arranged with an exclusive distinct pattern;
   sensing a multi-touch input by the touch-sensing interface when one of the at least one second devices is currently placed upon the touch-sensing interface of the first device, wherein the multi-touch input corresponds to a distinct pattern of the one of the at least one second device, and the one of the at least one second device is not electrically connected to the first device; and
   comparing the multi-touch input to a plurality of patterns stored in a library of the first device; and
   forming a wireless communicative connection between the first device and the one of the at least one second device using a wireless communication configuration stored in the library corresponding to the multi-touch input when the multi-touch input is matched with one of the plurality of patterns stored in the library.

2. The device identification method of claim 1, wherein the physical contacts are disposed on one surface of the each second device.

3. A communicative connection method between multiple devices, the devices comprising a first device and at least one second device, the first device comprising a touch-sensing interface and a first wireless communication module, each second device comprising a second wireless communication module and a plurality of physical contacts arranged with an exclusive distinct pattern, the communicative connection method comprising:
   sensing a multi-touch input by the touch-sensing interface when one of the at least one second devices is currently placed upon the touch-sensing interface of the first device, wherein the multi-touch input corresponds to a distinct pattern of the one of the at least one second device and the one of the at least one second device is not electrically connected to the first device;
   comparing the multi-touch input to a plurality of patterns stored in a library of the first device; and
   forming a wireless communicative connection between the first wireless communication module of the first device and a second wireless communication module of the one of the at least one second device using a wireless communication configuration stored in the library corresponding to the multi-touch input when the multi-touch input is matched with one of the plurality of patterns stored in the library.

4. The communicative connection method of claim 3, wherein the physical contacts are disposed on one surface of the each second device.

5. The communicative connection method of claim 3, wherein each the plurality of patterns stored in the library corresponds to an exclusive second device of the at least one second device.

6. The communicative connection method of claim 3, wherein the wireless communication configuration is loaded by the first wireless communication module for forming the wireless communicative connection when the multi-touch input is matched with the one of the plurality of patterns stored in the library.

7. The communicative connection method of claim 3, wherein the multi-touch input is treated as a regular touch input when the multi-touch input is not matched to any pattern stored in the library.

8. The communicative connection method of claim 3, wherein the multi-touch input is registered as a new pattern into the library when the multi-touch input is not matched to any pattern stored in the library.

9. The communicative connection method of claim 3, wherein the library is further configured for storing a corresponding privilege level corresponding to each of the at least one second device.

10. The communicative connection method of claim 3, wherein the wireless communication configuration comprises contents selected from the group consisting of Service Set Identifications (SSID), Media Access Control (MAC) addresses, passwords, encryption keys and Internet Protocol (IP) addresses of different second devices.

11. The communicative connection method of claim 3, wherein the wireless communicative connection is formed based on a protocol selected from the group consisting of Wireless Fidelity (WiFi), WiFi direct, Zigbee, Near Field Communication (NFC) and Infrared Communication.

12. An interface controlling method of a wireless communicative connection between multiple devices, the multiple devices comprising a first device and at least one second device, the first device comprising a displaying interface, a first wireless communication module and a touch-sensing interface integrated on the displaying interface, each of the at least one second device comprising a second wireless communication module and a plurality of physical contacts arranged with an exclusive distinct pattern, the interface controlling method comprising:
   sensing a multi-touch input by the touch-sensing interface when one of the at least one second device is currently placed upon the touch-sensing interface of the first device, wherein the multi-touch input corresponds to a distinct pattern of the one of the at least one second device, and the one of the at least one second device is not electrically connected to the first device;
   comparing the multi-touch input to a plurality of patterns stored in a library of the first device;
   forming the wireless communicative connection between the first wireless communication module of the first device and a second wireless communication module of the one of the at least one second device; and
   splitting a screen on the displaying interface into a first partition and a second partition.

13. The interface controlling method of claim 12, wherein the first device further comprises a first storage unit for storing a plurality of first files, the one of the at least one second device further comprises a second storage unit for storing a plurality of second files, the interface controlling method further comprises:

showing items related to the plurality of first files from the first device in the first partition; and selectively showing items related to the plurality of second files from the one of the at least one second device in the second partition.

14. The interface controlling method of claim 13, wherein, when one of the items from the first device is selected and dragged from the first partition to the second partition, the interface controlling method further comprises:

transmitting a first file related to the selected item from the first device to the second device through the wireless communicative connection.

15. The interface controlling method of claim 13, wherein, when one of the items from the one of the at least one second device is selected and dragged from the second partition to the first partition, the interface controlling method further comprises:

transmitting a second file related to the selected item from the one of the at least one second device to the first device through the wireless communicative connection.

16. The interface controlling method of claim 12, wherein the second partition is located at where the one of the at least one second device is placed on the first device.

* * * * *